(12) United States Patent
Morasse

(10) Patent No.: US 8,353,661 B2
(45) Date of Patent: Jan. 15, 2013

(54) VEHICLE MOUNTED LIFT

(76) Inventor: Michael Alfred Joseph Morasse, Summerland (CA)

( * ) Notice: Subject to any disclaimer, the term of this patent is extended or adjusted under 35 U.S.C. 154(b) by 0 days.

(21) Appl. No.: 12/801,560

(22) Filed: Jun. 15, 2010

(65) Prior Publication Data

US 2011/0305548 A1    Dec. 15, 2011

(51) Int. Cl.
    *B60P 1/43* (2006.01)
(52) U.S. Cl. ............... 414/462; 414/480; 410/26
(58) Field of Classification Search .......... 414/462, 414/480; 410/26
    See application file for complete search history.

(56) References Cited

U.S. PATENT DOCUMENTS

| | | | |
|---|---|---|---|
| 2,624,546 A * | 1/1953 | Haumerson | 187/204 |
| 3,221,669 A | 12/1965 | Baker et al. | |
| 3,726,423 A | 4/1973 | Miron | |
| 3,871,540 A | 3/1975 | Jenkins | |
| 3,872,989 A | 3/1975 | Smithson et al. | |
| 3,902,613 A * | 9/1975 | Newland | 414/538 |
| 3,972,433 A * | 8/1976 | Reed | 414/462 |
| 4,239,438 A | 12/1980 | Everson | |
| 4,328,989 A * | 5/1982 | Childers | 296/26.05 |
| 4,749,317 A | 6/1988 | Daniel | |
| 4,954,038 A | 9/1990 | Sheahan | |
| 5,108,248 A | 4/1992 | Murrill | |
| 5,129,776 A * | 7/1992 | Peng | 414/228 |
| 5,281,075 A | 1/1994 | Tatman et al. | |
| 5,297,653 A * | 3/1994 | Wurtz et al. | 182/69.5 |
| 5,335,755 A * | 8/1994 | Miller | 414/249 |
| 5,431,525 A | 7/1995 | Scott | |
| 5,468,115 A * | 11/1995 | Alvis | 414/556 |
| 5,497,854 A * | 3/1996 | Fang | 187/213 |
| 5,622,299 A | 4/1997 | Berard | |
| 6,241,048 B1 * | 6/2001 | Heilmann | 187/263 |
| 6,485,237 B1 * | 11/2002 | Sandwith | 410/24 |
| 6,705,820 B2 | 3/2004 | Schilling | |
| 2006/0151247 A1 * | 7/2006 | Raffler et al. | 187/208 |
| 2008/0014068 A1 | 1/2008 | Smith | |

* cited by examiner

*Primary Examiner* — Saul Rodriguez
*Assistant Examiner* — Jonathan Snelting
(74) *Attorney, Agent, or Firm* — Richard D. Okimaw

(57) ABSTRACT

An apparatus for transporting small vehicles within the bed of a truck which comprises a frame sized to be locatable within the bed of a truck, a platform slidably supported by the frame movable between a first position parallel to and proximate to the bed of the truck and a second position parallel to and vertically spaced above the first position and an actuator operable to move the platform between the first and second positions. The actuator may comprises a winch and the apparatus may include at least one catch for selectively engaging and supporting the platform at the second position.

13 Claims, 6 Drawing Sheets

VEHICLE MOUNTED LIFT

BACKGROUND OF THE INVENTION

1. Field of Invention

The present invention relates to vehicle transportation in general and in particular to an apparatus for transporting small vehicles within the bed of a truck.

2. Description of Related Art

The use of recreational type vehicles is a common and enjoyable pastime. Such recreational type vehicles may comprise all terrain vehicles (ATVs) snowmobiles and the like. It is well known that the use of such vehicles is not permitted in residential neighborhoods where many users live. Therefore it is frequently necessary to transport such vehicles to a location where they can be safely used in compliance with local regulations.

ATVs are typically transported with the use of pick-up trucks either in the bed of the truck or on a trailer towed therebehind. Such trailers are often not practical due to the difficulty of towing such a trailer through difficult terrain or being required to turn the truck and trailer around in a relatively tight space.

It is common for users to wish to transport two ATVs at the same time so that more than one person may participate in this activity at the same time. Present difficulties exist with current devices for transporting two ATVs on pick-up trucks. Such devices commonly include ATV carrier racks comprising a platform supported above the box of the pick-up truck. Such platforms are commonly designed to carry the ATVs either side by side or one behind the other therein and are therefore commonly substantially wider than the pick-up truck itself. This increased width due to the ATV carrier makes navigating the pick-up more difficult. Additionally, having both ATVs supported at an elevated height above the box of the pick-up truck increases the center of gravity of the truck.

Previous attempts to solve the above difficulties have not been adequate. In particular, some previous solutions have provided an elevated rotatable platform supported above the bed of a truck which may be angled to load a top ATV and then raised to permit storage of a second ATV thereunder. An example of such devices is disclosed in U.S. Patent Application Publication No. 2008/0014068 to Smith. A disadvantage of such rotating platforms is that the topmost ATV is required to be loaded onto an angled platform. This can be dangerous and difficult due to the need to stop and stabilize the ATV on the angled platform before securing it thereto and thereafter raisin the top platform.

SUMMARY OF THE INVENTION

According to a first embodiment of the present invention there is disclosed an apparatus for transporting small vehicles within the bed of a truck. The apparatus comprises a frame sized to be locatable within the bed of a truck, a platform slidably supported by the frame movable between a first position parallel to and proximate to the bed of the truck and a second position parallel to and vertically spaced above the first position and an actuator operable to move the platform between the first and second positions.

The frame may comprise a space frame. The frame may include for corner columns with the platform located therebetween. The columns at a front portion of the truck bed may be connected to each other at top portion thereof by a crossmember. The platform may be slidably located between the columns.

The platform may be maintained parallel to the bed of the truck by crossed interlinked pivotable scissor members. The platform may be sized to support a small vehicle thereon. The small vehicle may be selected from the group consisting of all terrain vehicles and snowmobiles.

The actuator may comprises a winch located at an upper portion on a front portion of the frame, the winch has an elongate tension member extending in a downward direction to the platform so as to be operable to lift the platform to the second position. The winch may include a pair of elongate tension members each extending to an opposed side of the platform. Each of the pair of elongate tension members may passe over a roller so as to extend in a substantially vertical direction between the roller and the platform. The winch may comprise an electric winch utilizing an electrical system of the truck as a power supply.

The apparatus may further comprise at least one catch for selectively engaging and supporting the platform at the second position. Each corner upright may include a catch. The catch may comprise a pivotable body having a support surface, the pivotable body being rotatable into a first position such that the platform rests upon the support surface and a second position out of a path of travel of the platform. The catch may be biased towards the second position by a release spring. The catch may be selectably biased towards the first position by a retaining spring. The retaining spring may be selectably coupleable to the catch so as to selectably bias the catch to the first position when the retaining spring is connected to the catch and towards the second position when the retaining spring is decoupled from the catch.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
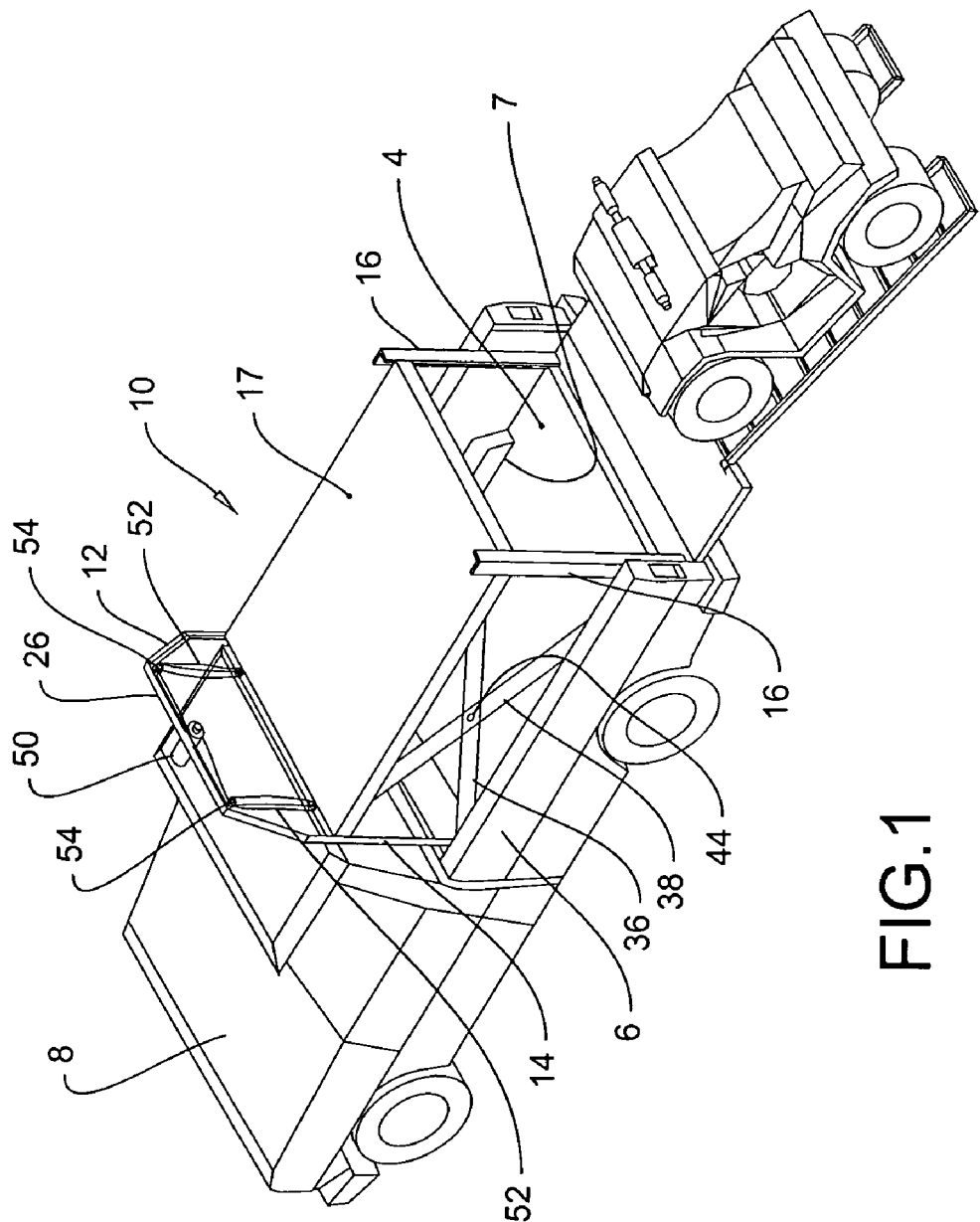
FIG. 1 is a perspective view of a pick-up truck having an apparatus for transporting small vehicles according to a first embodiment of the present invention in a bed thereof.

Referring to FIG. 1, an apparatus for supporting small vehicles according to a first embodiment of the invention is shown generally at 10 located in the bed 6 of a pick-up truck 8. As described herein small vehicles include all terrain vehicles (ATVs), snowmobiles as well as any other recreational-type vehicle which may be transported by a pick-up truck. For reference, such vehicles as utilized herein are referred to as ATVs. Although the present description refers to supporting ATVs, it will be appreciated that the apparatus 10 may also be utilized to support and carry a wide variety of objects, such as, by way of non-limiting example, equipment and building materials. In the case of building materials, it will be appreciated that the platform 30 may be located at a height sufficient to permit any building materials located thereon to pass over the top of the cab of the pick-up to facilitate carrying of long materials such as lumber and the like. As illustrated the apparatus 10 is secured to the bed 6 of a pick-up truck 8 within the box 4 thereof although it will be appreciated that the apparatus may also be secured to the bed of other types of vehicles such as by way of non-limiting example flat deck trucks. The apparatus comprises a frame 12 supporting a vertically movable platform 30 supported by the frame and an actuator for moving the platform between first and second positions.

Figure 2:
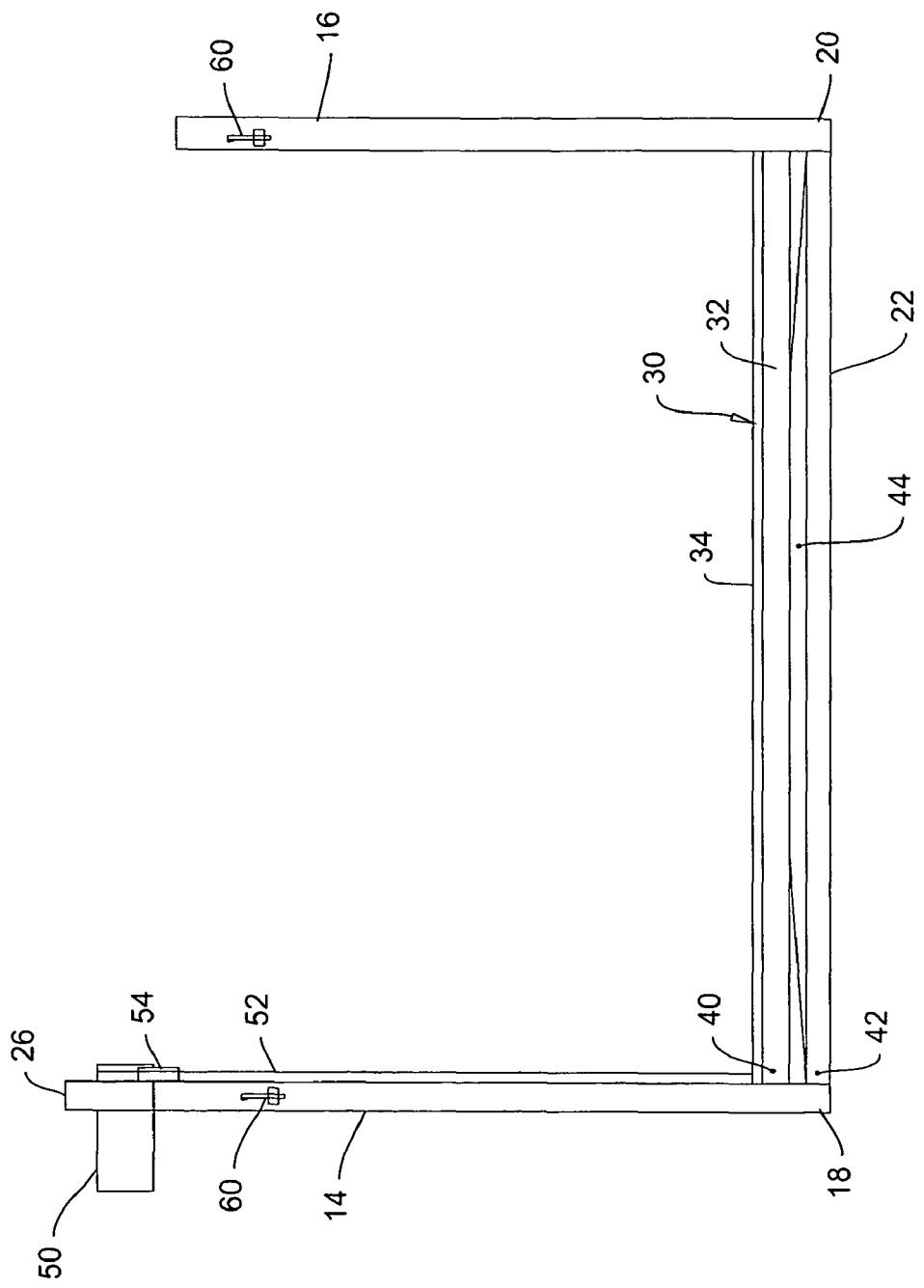
FIG. 2 is a side view of the apparatus of FIG. 1 at a second or raised position.
Figure 3:
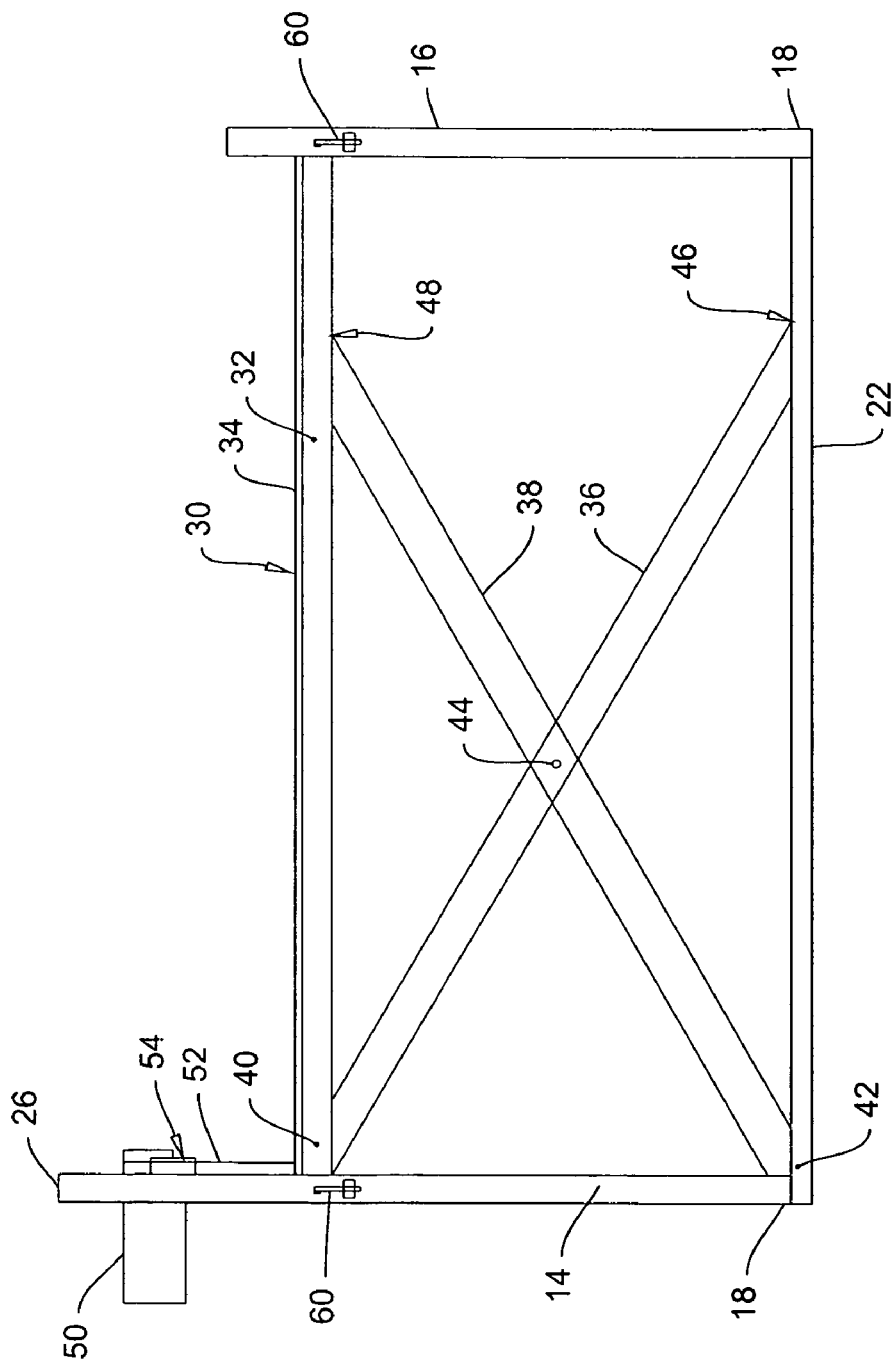
FIG. 3 is a side view of the apparatus of FIG. 1 at a first or lowered position.

Turning to FIG. 2, a side view of the apparatus 10 is illustrated. The frame 12 comprises a pair of spaced apart front uprights 14 and a pair of spaced apart rear uprights 16. The front uprights 14 are located proximate to the front of the bed 6 of the truck 8 and the rear uprights 16 are located proximate to the rear of the bed of the pick-up truck. The front and rear uprights may further be spaced away from the sides of the bed of the pick-up truck by a distance sufficient to permit the platform to pass between the wheel arches 7 of the pick-up truck. A base member 22 may span bottom portions 18 and 20, respectively, of the front and rear uprights 14 and 16. Each of the front and rear uprights 14 and 16 includes a catch 60 for engaging and supporting the platform to a raised or second position as illustrated in FIG. 3. As will be further described below, the catches 60 are selectably releasable so as to permit the platform to be lowered to a bottom or first position as illustrated in FIG. 3. The front uprights 14 are connected a top portion 24 thereof by a cross member 26 supporting a winch 50 for raising and lowering the platform 30. The frame 12 may be formed of metal members such as L-channel, c-channels, rods, bars and the like. The members forming the frame 12 may be welded bolted or otherwise connected to each other by any known method. The frame 12 may be secured to the bed 4 of the truck 8 by any know method such as bolts, buckles, camper tie downs or any other method as are commonly known in the art. It will also be appreciated that the frame 12 may be secured to the stake pockets of the truck 8 by commonly known methods.

The platform 30 comprises a rigid planar member having a rectangular outline defined by a plurality of frame members 32. The platform may be constructed of a space perimeter frame of metal members such as L-channels, c-channel or the like. A deck 34 of plywood or any other ridged decking material so as to provide a surface suitable for supporting an ATV thereon. The platform 30 may be stabilized in an orientation parallel to the bed 4 of the truck 8 by first and second scissor arms, 36 and 38, respectively extending between the platform 30 and the bed 4. The first scissor arm 36 is pivotally connected to the underside of the platform 30 at pivot 40 and extends towards the rear of the apparatus to a free end 46. The free end 46 includes a slider or roller thereon to permit the free end 46 to freely move longitudinally along the bed 4 as the platform 30 is raised and lowered. The second scissor arm 38 is pivotally connected to the base member 22 at pivot 42 and extends towards the rear of the apparatus to a free end 48. The free end 48 includes a slider or roller thereon to permit the free end 48 to freely move longitudinally along the underside of the platform 30 as the platform is raised and lowered. The first and second scissor arms 36 and 38 have substantially equal length and are pivotally connected to each other at a middle portion thereof 44. The first and second scissor arms 36 and 38 serve to maintain the platform 30 parallel to the bed 4 of the truck 8 as it is moved up and down.

The winch 50 may comprise an electric winch as are commonly known in automotive, and recreational vehicles, such as, by way of non-limiting example an ATV winch. Although the winch 50 is illustrated as being located on the cross member 26 at a position above the platform 30, it will be appreciated that it may also be located at other locations such as beside, on or below the platform wherein the elongate tension members 52 extend between the winch 50 and either the platform 30 or the frame 12 so as to provide a lifting force to the platform 30. Accordingly, the winch includes power wires from the electrical system of the truck 8 as well as an on/off switch and up and down controls (not shown) as are commonly known. The winch includes a pair of elongate tensions members 52, such as by way of non-limiting example, a cable, rope or chain extending therefrom to opposed sides of the apparatus 10. Each elongate tension member 52 extends over at least one pulley 54 supported by the cross member 26 and downwardly to the platform 30. Through the use of the pair of elongate tension members 52 and pulleys 54, the winch is therefore able to apply a consistently upwards lift force to the platform for movement between the first and second positions. It will be appreciated that utilizing more than one pulley on the cross member 26 and the platform 30 will enable the winch to lift a greater weight of platform and ATV through the mechanical advantage of the pulleys.

In operation, the platform 30 may be lowered to a first position as illustrated in FIG. 2 proximate to the bed 4 of the truck 8 to have a first ATV placed thereon. Thereafter the winch 50 may then be utilized to raise the platform 30 and first ATV to a raised or second position as illustrated in FIG. 3 position whereby a second ATV may be loaded under the platform 30. It will be appreciated that the present design does not include any components located within the space under the platform 30 where the second ATV is to be located.

Figure 4:
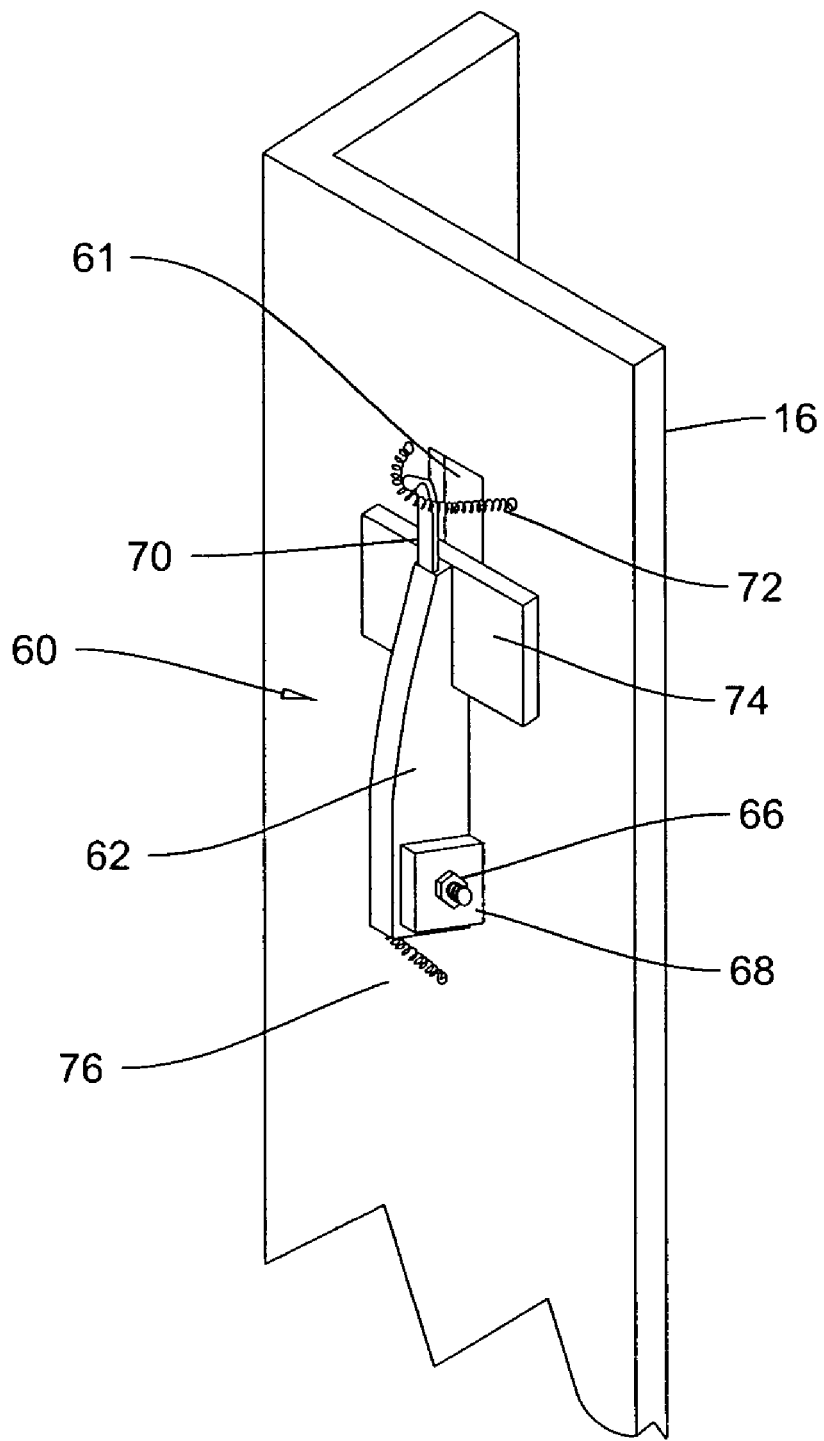
FIG. 4 is a front view of a catch of the apparatus of FIG. 1.
Figure 5:
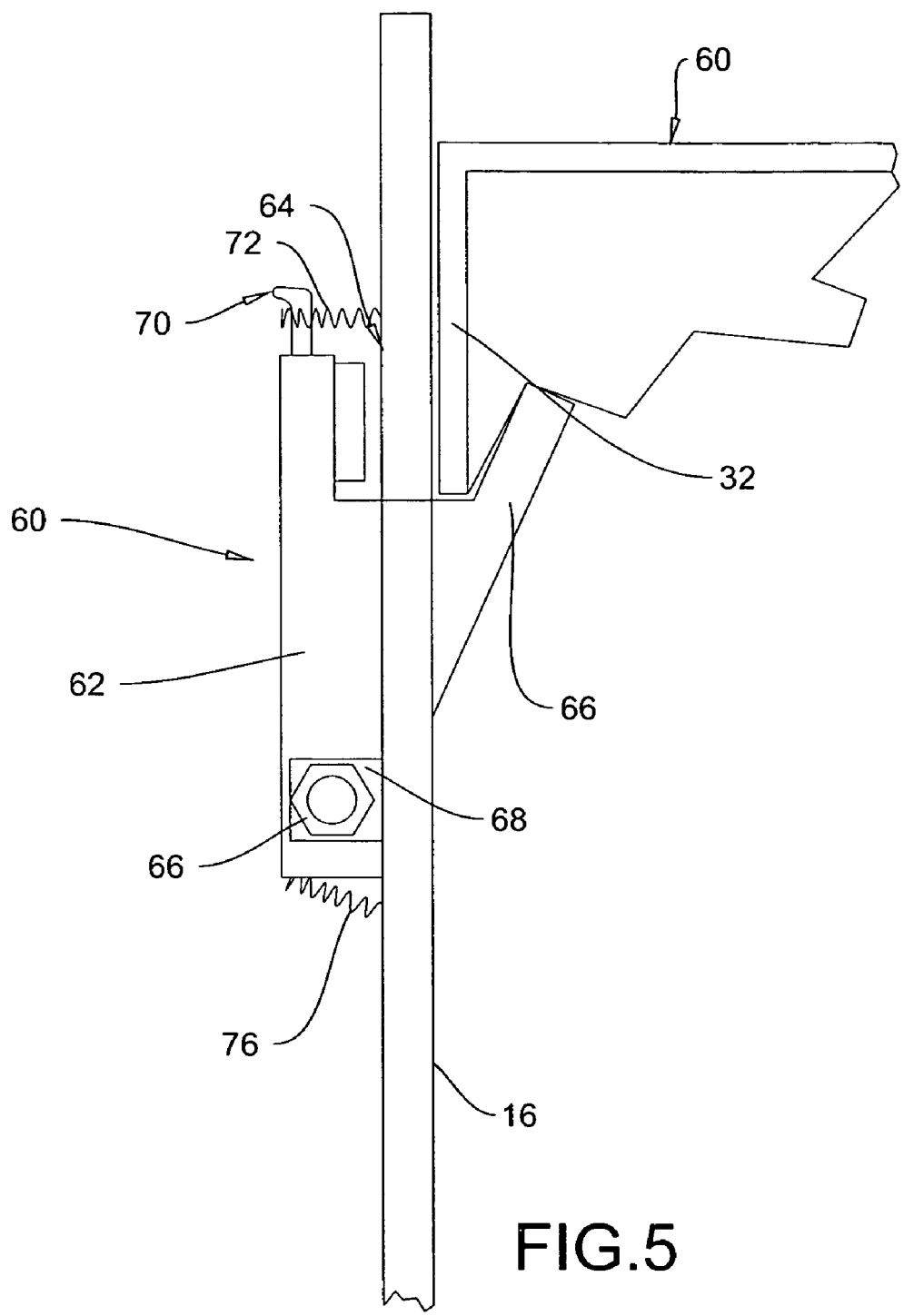
FIG. 5 is a side view of a catch of the apparatus of FIG. 1 at a first or platform supporting position.
Figure 6:
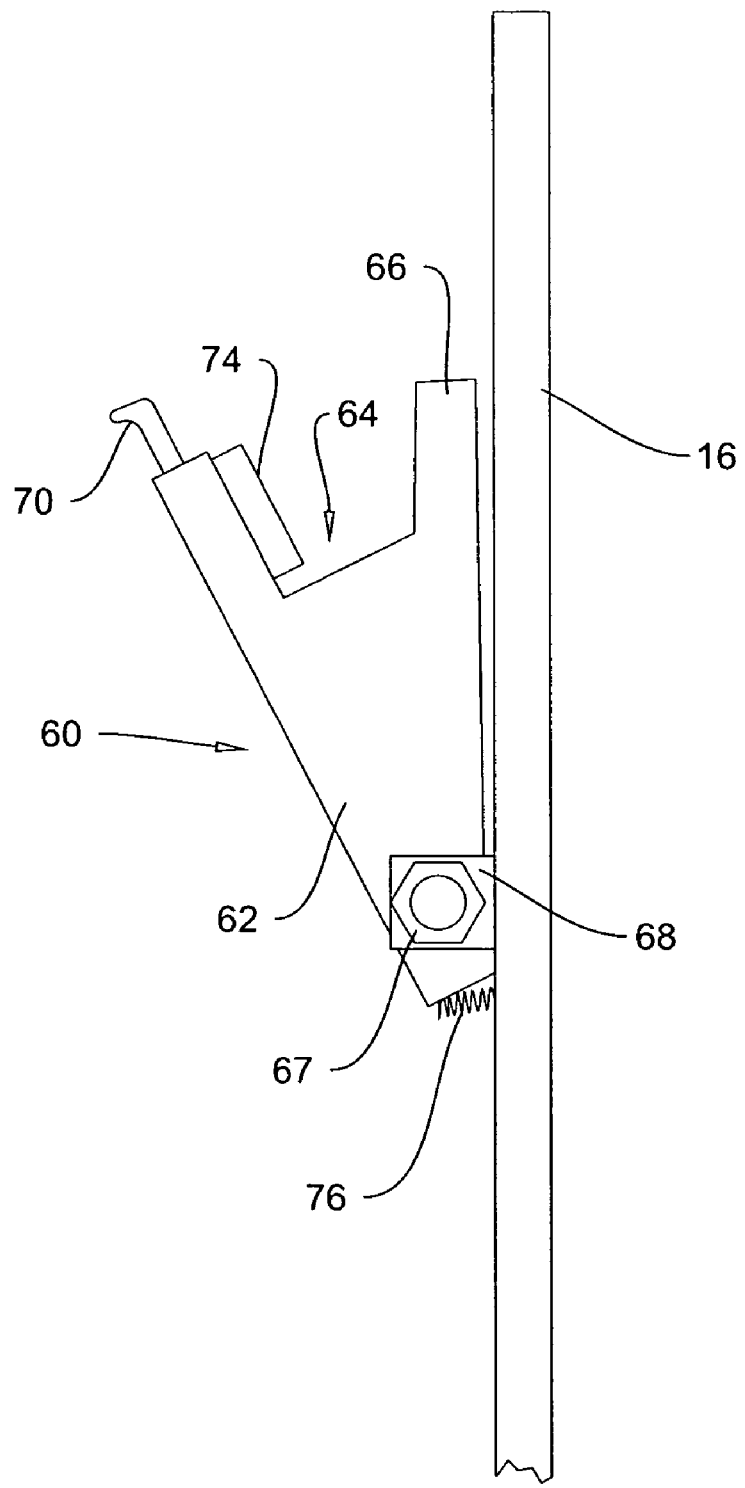
FIG. 6 is a side view of a catch of the apparatus of FIG. 1 at a second or release position.

Turning now to FIGS. 4 through 6, each upright 14 and 16 may have a catch 60 for supporting the platform 30 extending through a slot 61 therein. The catch 60 may be a pivoting member 62 having a notch 64 therein to receive a frame member 32 of the platform 30. The notch 64 may be defined by a finger 66 extending towards the frame member 32. The pivoting member 62 may be rotatable about a bolt 67 or other suitable means suspended between a pair of support plates 68 extending from the upright to either side of the slot 61. The pivoting member 62 may have a hook 70 extending from a top portion thereof to receive a retaining spring 72 therein so as to retain the pivoting member 62 in locked position such that the finger 66 is on the same side of the upright as the frame member 32 so as to catch and support the platform 30. A bridging plate 74 may be connected to the notch 64 perpendicularly to the slot 61 so as to prevent the pivoting member 62 from rotating completely through the slot 61. A release spring 76 at a bottom of the pivoting member 62 biases the pivoting member 62 in a direction opposed to the retaining spring 72 so as to remove the finger 66 from the same side of the upright as the platform 30 and thereby to release the platform from the catch 60. Optionally, the uprights 14 and 16 may other ratcheting or selectable support means for selectably supporting the platform 30 at a desired height. It will also be appreciated that winch 50 or other means may include a gear reducer such that the winch 50 is operable to retain the platform 30 at the desired height due to the internal mechanical and electrical resistance of the motor to rotation.

In operation, the platform 30 may be raised above the catch 60 and the retaining spring 72 engaged on the hook 70. Thereafter the platform 30 may be lowered into the second position illustrated in FIG. 3 to be supported by the finger 66.

To lower the platform 30, it may be raised to disengage the platform 30 from the finger 66 and the retaining spring 72 removed from the hook 70. Thereafter the release spring 76 will retract the finger 66 so as to permit the platform to be lowered to its bottom or first position as illustrated in FIG. 2. Additionally, the platform 30 may be located and maintained at a height to be substantially aligned with the top of the box of the pick-up truck by the winch 50. At such a height, a region below the platform in conjunction with a locking tailgate of the pick up truck may form a storage compartment which is secure from theft.

While specific embodiments of the invention have been described and illustrated, such embodiments should be considered illustrative of the invention only and not as limiting the invention as construed in accordance with the accompanying claims.

What is claimed is:

1. An apparatus for transporting small vehicles within the bed of a truck, the apparatus comprising:
    a frame having four corner columns sized to be locatable within the bed of a truck;
    a platform slidably supported between said corner columns said frame movable between a first position parallel to and proximate to a bottom horizontal surface of said bed of said truck and a second position parallel to and vertically spaced above said first position;
    an actuator, operable to move said platform between said first and second positions; and
    wherein each corner upright includes a catch for selectively engaging and supporting said platform at said second position, wherein each catch comprises a pivotable body having a support surface, said pivotable body being rotatable into a first position such that said platform rests upon said support surface and a second position out of a path of travel of said platform.

2. The apparatus of claim 1 wherein said columns at a front portion of the truck bed are connected to each other at top portion thereof by a cross-member.

3. The apparatus to claim 1 wherein said platform is slidably located between said columns.

4. The apparatus of claim 3 wherein said platform is maintained parallel to the bed of the truck by crossed interlinked scissor members.

5. The apparatus of claim 1 wherein said platform is sized to support a small vehicle thereon.

6. The apparatus of claim 5 wherein said platform is sized to support a small vehicle selected from the group consisting of all terrain vehicles and snowmobiles.

7. The apparatus of claim 1 wherein said actuator comprises a winch located at an upper portion on a front portion of said frame, said winch having an elongate tension member extending in a downward direction to said platform so as to be operable to lift said platform to said second position.

8. The apparatus of claim 7 wherein said winch includes a pair of elongate tension members each extending to an opposed side of the platform.

9. The apparatus of claim 8 wherein said each of said pair of elongate tension members passes over a roller so as to extend in a substantially vertical direction between said a roller and said platform.

10. The apparatus of claim 7 wherein said winch comprises an electric winch utilizing an electrical system of the truck as a power supply.

11. The apparatus of claim 1 wherein said catch is biased towards said second position by a release spring.

12. The apparatus of claim 11 wherein said catch is selectably biased towards said first position by a retaining spring.

13. The apparatus of claim 12 wherein said retaining spring is selectably coupleable to said catch so as to selectably bias said catch to said first position when said retaining spring is connected to said catch and towards said second position when said retaining spring is decoupled from said catch.

\* \* \* \* \*